Feb. 22, 1927.
W. R. NEWTON
1,618,464
CULTIVATOR ATTACHMENT FOR TRACTORS
Filed Sept. 8, 1925    3 Sheets-Sheet 2
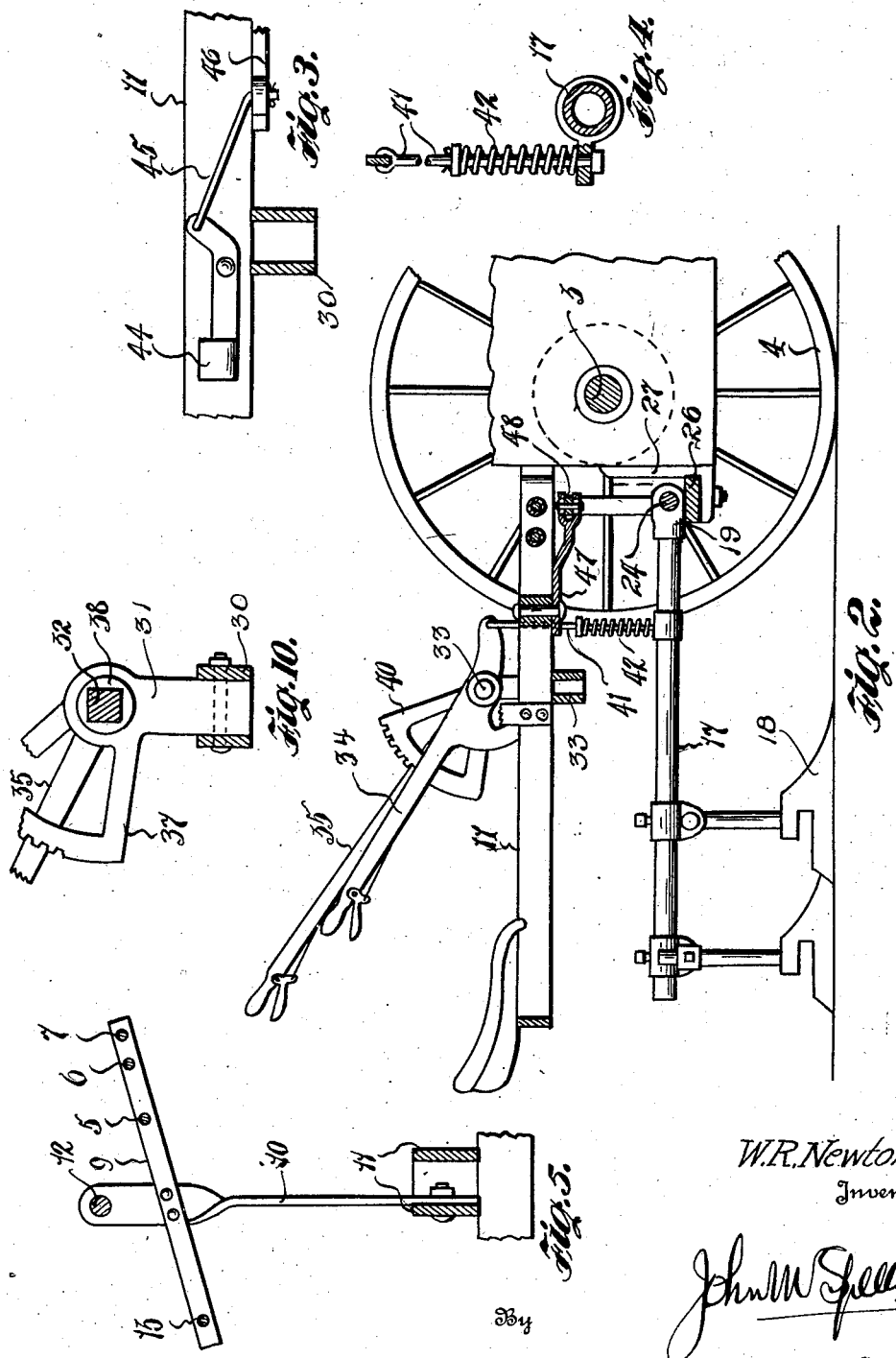
W.R. Newton,
Inventor
By John M Spellman
Attorney

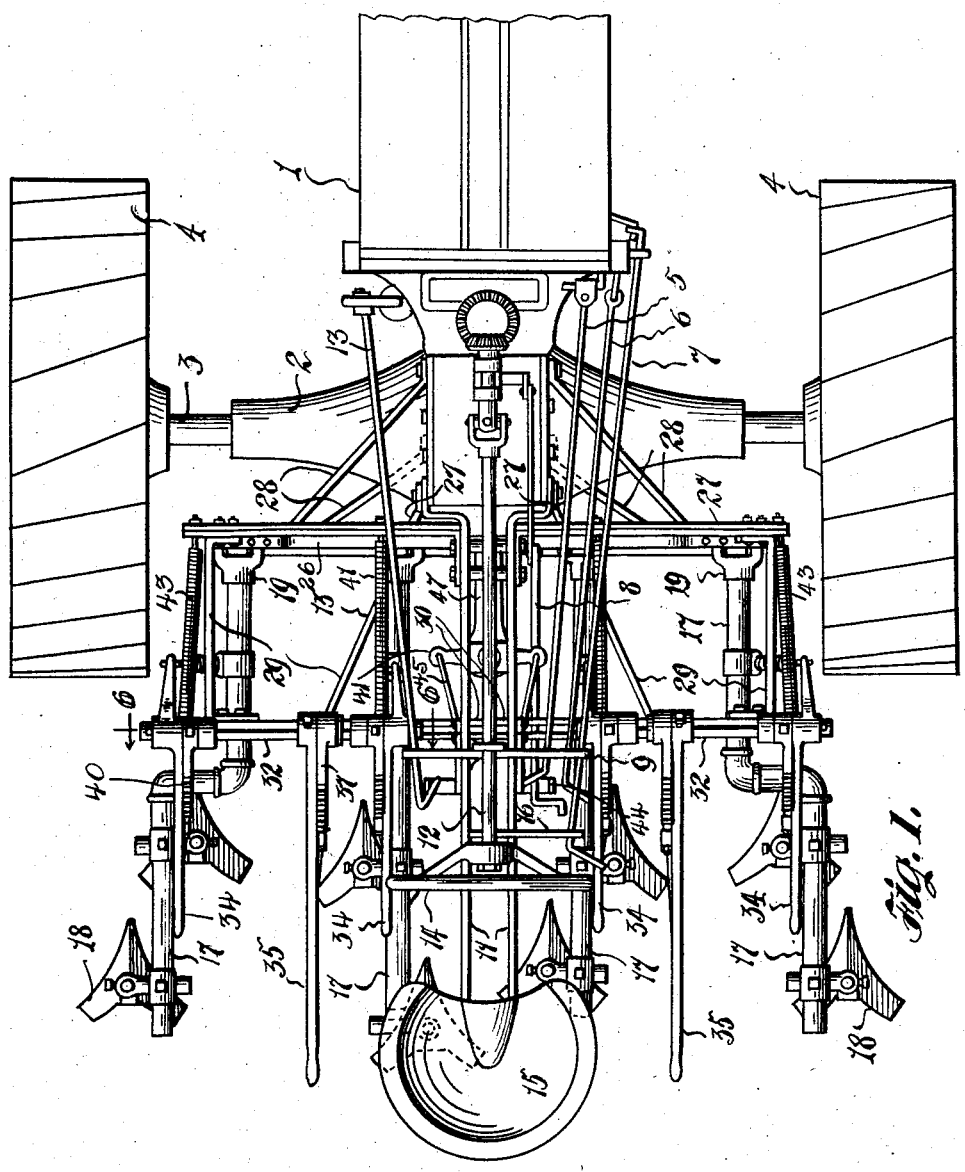

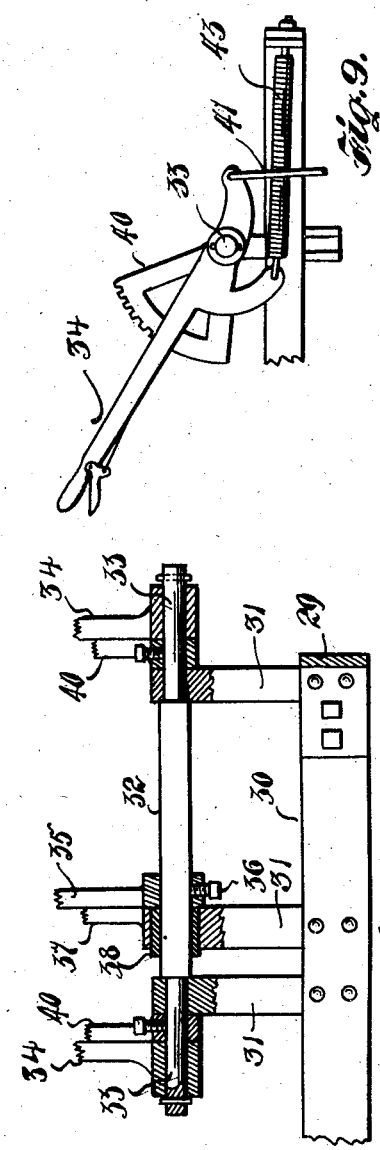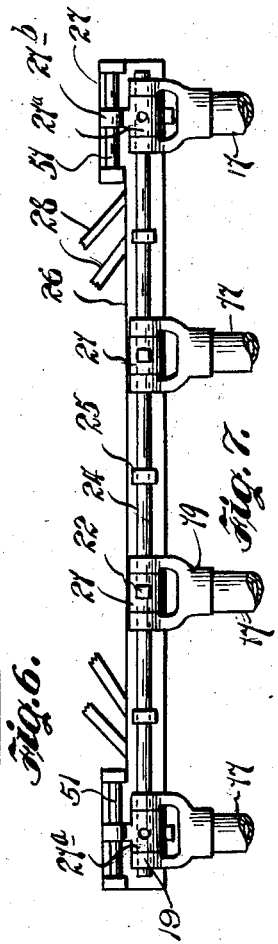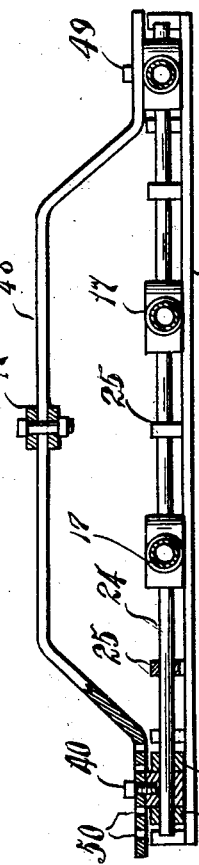

Patented Feb. 22, 1927.

1,618,464

UNITED STATES PATENT OFFICE.

WILLIAM R. NEWTON, OF HILLSBORO, TEXAS.

CULTIVATOR ATTACHMENT FOR TRACTORS.

Application filed September 8, 1925. Serial No. 55,015.

This invention relates to new and useful improvements in farm implements and it relates more particularly to a cultivator which is attached to and made a part of a tractor.

One of the particular features embodied in this arrangement is that the tractor and cultivator thus form a unit and enable the unit to be operated by one man.

Another important object of the invention is to provide a tractor cultivator unit so constructed that the cultivator beams carrying the plows may be shifted laterally while the cultivator shovels are in the ground, thus enabling the plows to align with irregularities of the rows.

A further important feature is that each plow beam may be adjusted individually as to depth and all the beams raised or lowered while in their adjusted positions.

Means are also provided for holding the plow beams or cultivator feet in the ground, and also the construction of the machine permits the control levers of the engine to be within easy reach for operation.

With the above and other objects in view, the invention will be better understood by reference to the following description taken in connection with the accompanying drawings forming part hereof and in which—

Figure 1 is a plan view of a tractor of universal type and embodying the cultivator.

Figure 2 is a side view partly in section of the cultivator and co-acting parts.

Figure 3 is a sectional detail view of a foot pedal and connecting parts for shifting the beams from side to side.

Figure 4 is a sectional detail view of a spring and connecting parts for holding the plows in the ground.

Figure 5 is a detail view of means employed to support the steering shaft and operating levers of the tractor engine.

Figure 6 is a detailed view, partly in cross-section adjacent the rod supporting the control levers for the beams, along the line 6—6.

Figure 7 is a top view in detail showing the connection of the beams to the tractor.

Figure 8 is a cross-sectional view, illustrating an arch bar for shifting the beams and showing also their connection to the tractor.

Figure 9 is a detail view of one of the levers and segment for lifting each beam individually, and Figure 10 is a sectional detail view of one of the levers and segments for lifting the beams collectively.

In the drawings wherein separate numerals are used to designate various parts, 1 denotes a tractor engine, 2 the transmission case and 3 the axles with supporting wheels 4—4. The spark, choke and gas levers are indicated at 5, 6 and 7 and the clutch lever at 8. The spark, choke and gas levers are supported and are passed through a diagonally disposed bar 9, shown in Figure 5. This bar is supported by a member 10 secured to one of the seat supporting bars 11. The steering rod 12 is also passed through and is supported by the member 10 and the gear shift lever 13 also traverses and is supported by the bar 9. The gas lever 7 extends to within easy reach of the steering wheel 14 near the seat 15 and is also supported by a member 16 secured to one of the seat rods 11. This arrangement places all the control levers within easy reach of the operator, particularly the gas lever 7.

Each cultivator beam 17 carries cultivator shovels 18 and these beams are provided on their inner ends with cuffs 19. These cuffs as will be seen by reference to Figure 7, have spaced ends 20 for spacer members 21 provided with set screws 22, the screws to hold the beams in adjusted position. Spacer members 21ª have projections 21ᵇ to stabilize the beams. A rod 24 traverses the cuffs and spacer members, and the beams have free movement up and down while in adjusted position. The rod 24 is secured to spaced eye members 25 fastened to the draw bar 26. This draw-bar as will be observed in Figures 1 and 2, is supported upon angle irons 27 arranged in the center of the machine and bolted to the transmission case and is also provided with brace rods 28, also bolted to the transmission case, one brace-rod on each side of the transmission case being extended underneath the same as shown by dotted lines. Braces 29 also extend from the bar 27 to a part of the frame which consists of two bars 30—30 extending from side to side of the machine. Connected to the frame 30 by supports 31 are two bars 32 of square formation and rounded on their outer ends 33. The rounded outer ends 33 of these shafts or bars 32 have connected thereto through the medium of the levers 34 cultivator beams 17, whereas a lever 35 is connected to the medial or square portion of each shaft by means of the set screws 36 so that by manually moving the lever 35 the shafts 32 will be oscillated and in turn raise and lower each set of cultivator beams. Adjacent lever 35 is a segment 37 which has a rounded core 38 through which the square bar passes. This segment has the usual plunger rod to engage its teeth to lock the lever 35 in position. By this arrangement the square rod may be rotated and will lift its two beams 17 clear of the ground, as will be apparent hereinafter.

By reference to Figures 2, 6 and 9 it will be observed that the round ends 33 or bar 32 carry two levers 34 and segment 40, the segment being secured by set screw to the square bar 32. Now when it is desired to adjust the plows individually, lever 34 is depressed or raised and the lever being attached to the beam by rod 41, the beam will be lifted or lowered. The spring 42 acts to hold the plows downward. When properly adjusted, the two beams on each side may be both raised at once by the middle lever 35, since the segments 40 are rigid on shaft 32. A spring 43 assists in the raising and lowering of the beams.

The means for shifting the beams is provided for by the foot pedals 44, pivoted to the seat bars. These pedals have connected thereto a small rod 45, one on each pedal, and leading to a cross member 46. This cross member has a forwardly extended end 47 which is pivoted to an arch bar 48. This bar is fastened by set screws 49 to the spacers 21ª and each end has several holes 50 for adjustment. When the right hand foot pedal is moved forward all the beams are shifted to the right, the left hand pedal shifting them to the left. These beams are shifted along with the rod 24, the projection 21ᵇ sliding along the pin 51.

From the foregoing it will be apparent that the machine will carry out the objects set forth in a practical manner, and provides a two row cultivator which can be operated by one man. It should be understood that the tractor-cultivator is not limited to the specific arrangement for bringing about the operation thereof, but may be altered and modified to come within the meaning of the following claims.

I claim:

1. A cultivator attachment for tractors comprising a draw bar carried by the tractor, a transverse rod slidably mounted upon said bar, cultivator beams having the forward ends pivotally connected to said rod, a frame, a pair of shafts journalled upon said frame, manually operable levers journalled upon the opposite ends of said shafts, means for connecting said levers to the cultivator beams, a lever secured to the medial portion of each shaft whereby the cultivator beams may be raised and lowered, and means operatively connected to said rod whereby the cultivator beams may be shifted transversely of said draw bar.

2. A cultivator attachment for tractors comprising a draw bar, angle irons for connecting said draw bar to the tractor, a rod slidably mounted upon said draw bar, cultivator beams having their forward ends pivotally connected to said rod, seat supporting bars carried by the tractor, a frame connected to said seat supporting bars and draw bar, a pair of shafts journalled upon said frame, means operatively connecting said shafts with the cultivator beams whereby the latter may be raised and lowered, an arch bar connected to the opposite ends of said rod, a cross member pivotally supported by said seat supporting bars, foot pedals connected to said cross member, and means for connecting said cross member to said arch bar such as and for the purpose set forth.

3. In combination with a vehicle, a transverse bar connected therewith, a rod slidable transversely of the vehicle on said bar, beams of ground-working elements swingably connected in their forward portions with said rod, a frame, rockable shafts on said frame, means associated with each of said shafts whereby a beam is connected therewith, an operating-lever journaled on each of said shafts and connected with another of said beams, a lever secured to each of said shafts whereby said beams are raised and lowered, and means operatively connected with said rod whereby said beams may be shifted on said bar.

4. In combination with a vehicle, a drawbar, a rod slidable transversely of the vehicle on said bar, beams of ground-working elements swingably connected at their forward ends to said rod, a frame, rockable shafts mounted on said frame, operating-levers journaled on each of said shafts and connected with said beams, a lever secured to each of said shafts whereby said beams are raised and lowered, a laterally-swingable member on said frame connected with said rod, and foot-operable means arranged to swing said member and shift said rod and beams laterally of the vehicle.

5. In an agricultural vehicle, the combination, with seat-supporting members and a draw-bar, of a rod slidable transversely of the vehicle on said bar, beams of ground-working elements swingably connected at their forward ends to said rod, a frame connected to said members and bar, rockable shafts on said frame, means operatively connecting said shafts with said beams whereby the latter may be raised and lowered, an arch-bar connected to said rod, a laterally-swingable member on said frame connected with said arch-bar, and operating means for said laterally-swinging member.

In testimony whereof I affix my signature.

WILLIAM R. NEWTON.